Feb. 7, 1961
M. B. HAMMOND ET AL
2,970,847
VEHICLE SPRING SUSPENSION AND FLUID
PRESSURE LEVELING DEVICE THEREFOR
Filed March 6, 1956
3 Sheets-Sheet 1
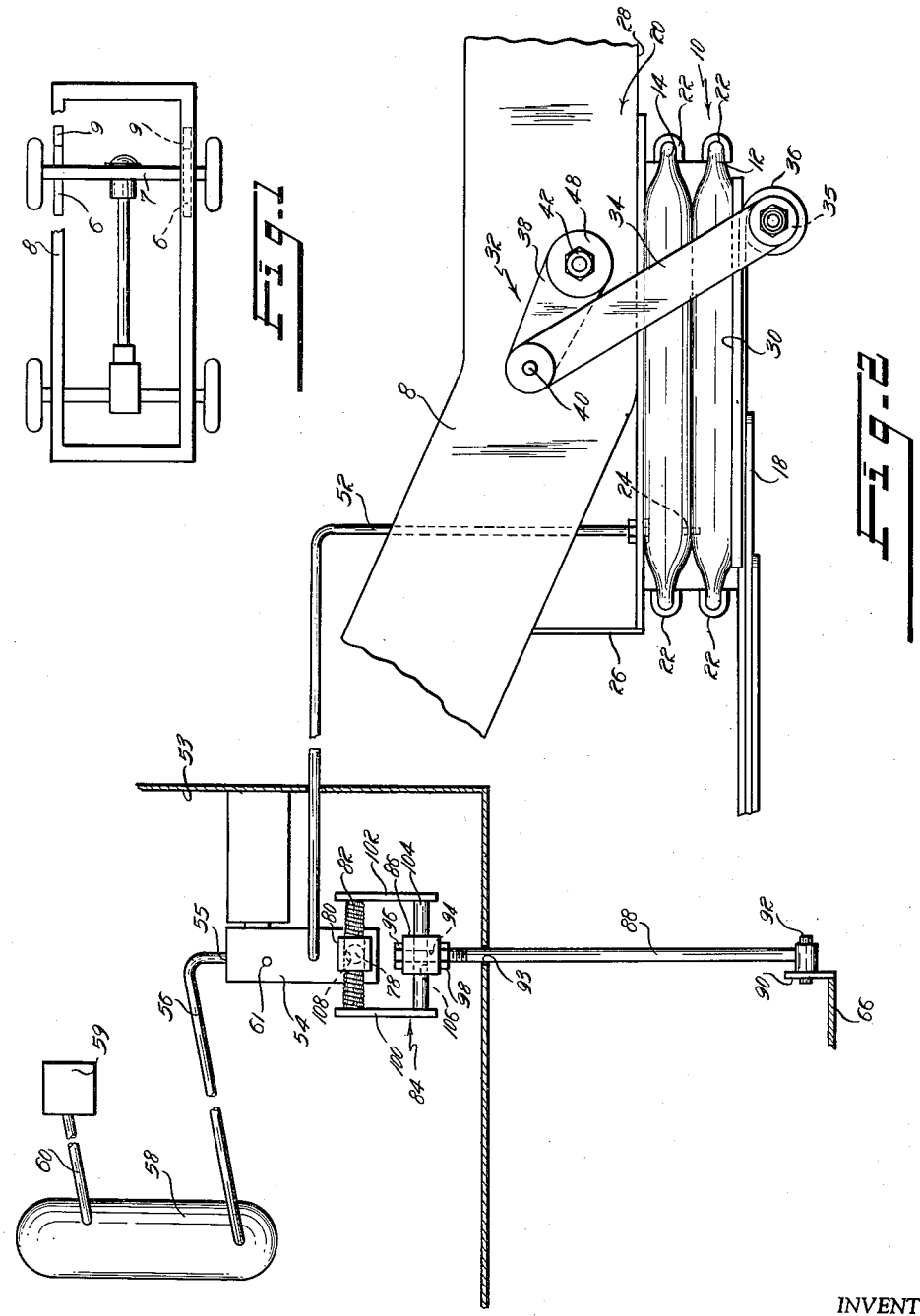
INVENTORS
MILTON B. HAMMOND
LOUIS J. HRUSOVSKY
BY Strauch, Nolan & Neale
ATTORNEYS Feb. 7, 1961 M. B. HAMMOND ET AL 2,970,847
VEHICLE SPRING SUSPENSION AND FLUID
PRESSURE LEVELING DEVICE THEREFOR
Filed March 6, 1956 3 Sheets-Sheet 2
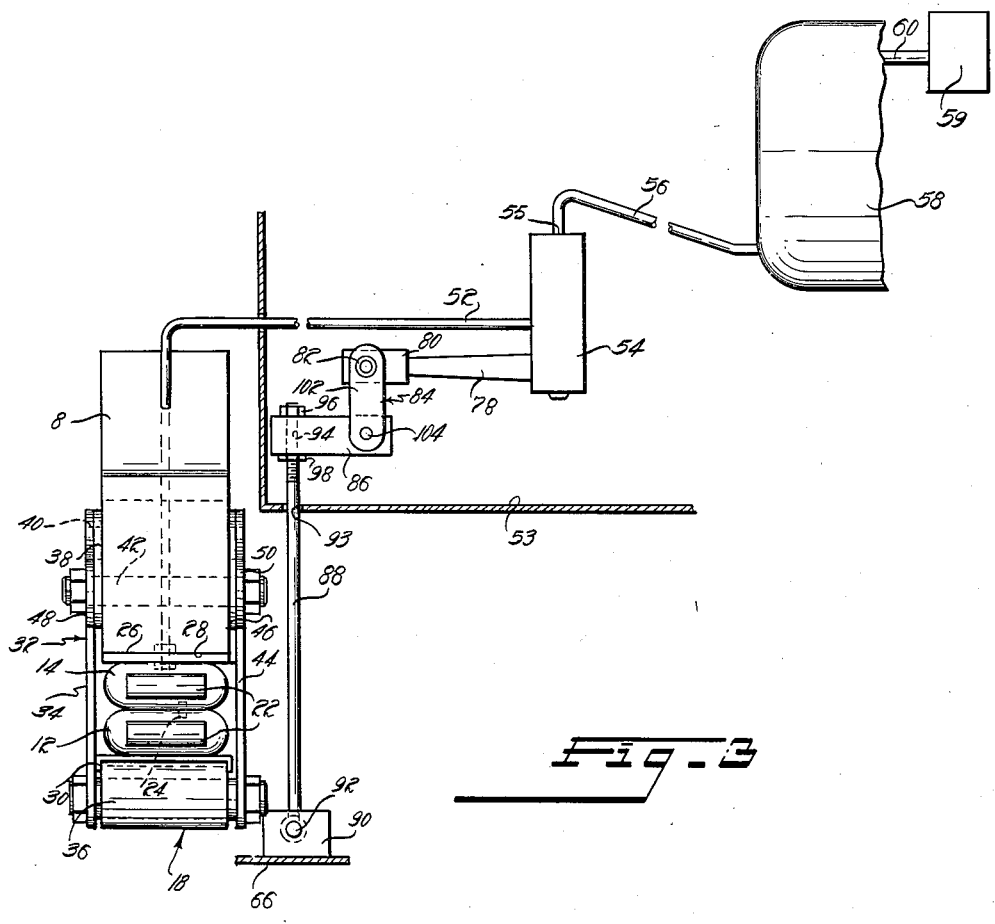
INVENTORS
MILTON B. HAMMOND
LOUIS J. HRUSOVSKY
BY Strauch, Nolan & Neale
ATTORNEYS Feb. 7, 1961 M. B. HAMMOND ET AL 2,970,847
VEHICLE SPRING SUSPENSION AND FLUID
PRESSURE LEVELING DEVICE THEREFOR
Filed March 6, 1956 3 Sheets-Sheet 3

INVENTOR
MILTON B. HAMMOND
LOUIS J. HRUSOVSKY
BY Strauch, Nolan & Neale
ATTORNEYS United States Patent Office 2,970,847
Patented Feb. 7, 1961

2,970,847

VEHICLE SPRING SUSPENSION AND FLUID PRESSURE LEVELING DEVICE THEREFOR

Milton B. Hammond, Edgeworth, and Louis J. Hrusovsky, Coraopolis, Pa., assignors to Rockwell-Standard Corporation, a corporation of Pennsylvania Filed Mar. 6, 1956, Ser. No. 569,853

10 Claims. (Cl. 280—124)

This invention relates to improvements in vehicles and has particular reference to automatically operative vehicle leveling systems incorporated in the suspension at the rear of automotive vehicles.

Present day passenger type automotive vehicles are either provided with soft suspensions to provide a soft comfortable ride for the passengers or, as in a sports car, provided with hard suspensions to provide stability and roadability of the vehicle. Vehicles having soft suspensions have certain operating characteristics due to the inertia of the vehicle body and frame which are quite objectionable and dangerous. When such vehicles are driven around a curve that is not properly banked for the speed of the vehicle, when the vehicle is turned sharply, or when the vehicle is driven over a laterally slanted road surface, there is a tendency for the vehicle body and frame to tilt relative to the axles. This tilting is distracting to the driver when slight and, when large, can result in overturning of the vehicle. When such vehicles are rapidly accelerated, there is a tendency for the rear end of the vehicle to sink and when such vehicles are rapidly decelerated there is a tendency for the rear end of the vehicle to rise relative to the axle. These operating characteristics of present day automotive vehicles having soft suspensions are both dangerous and discomforting to the passengers. In present day sports cars, hard suspensions are provided. Hard suspensions avoid these objectionable operating characteristics of soft suspension vehicles as described above but do not provide the ease and comfort of riding that results from the use of soft suspensions.

Various efforts have been made in the past to control variations of spacing between axles and a vehicle frame suspended thereupon resulting from variations in loading of the vehicle. Examples of such arrangements are shown in United States Patent No. 1,641,640 issued September 6, 1927 to J. W. Myers for Suspension for Vehicles and United States Patent No. 1,721,732 issued July 23, 1929 to C. A. Hawkins for Vehicle Suspension.

The object of the present invention is to provide a vehicle suspension and leveling system which is effective to provide a soft comfortable ride maintaining stability of the vehicle body and frame relative to the axles.

These and other objects of the present invention will become more fully apparent by reference to the appended claims and as the following detailed description proceeds in reference to the accompanying drawings wherein:

Figure 1 is a diagrammatic illustration of the relation of the vehicle frame, suspension, and axles in the present invention;

Figure 2 is a side view, partially diagrammatic showing the relation of the vehicle frame, rear end of the leaf spring, the expansible coupling and the fluid pressure control mechanism in the present invention for the left rear suspension of the vehicle shown in Figure 1;

Figure 3 is a rear view of the structure of Figure 2;

Figure 4:
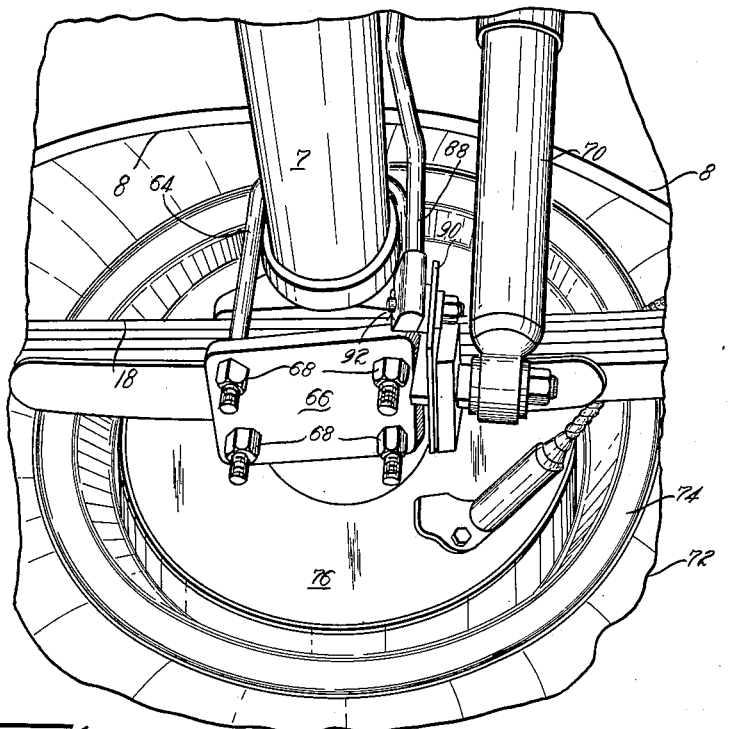
Figure 4 is a perspective view of the left end of the rear axle and of the associated vehicle components viewed from beneath the axle.

Referring to Figure 1, the present invention contemplates the provision, in each of the suspension linkages 6 between the opposite outer ends of the rear axle 7 of a vehicle and the body supporting frame 8 of a vehicle, of an expansible coupling 9 which may be automatically controlled to maintain a predetermined spatial relationship between the ends of the axle and the vehicle frame and the provision of an independent control for each such coupling which is effective in response to relative displacement between the axle and the frame from such predetermined spatial relationship to so adjust the associated coupling to restore such predetermined spatial relationship.

The structures and controls of the suspension linkages 6 and the expansible couplings 9 at the opposite ends of the rear axle are identical so that a description of but one of such structures and controls will suffice.

Figure 5:
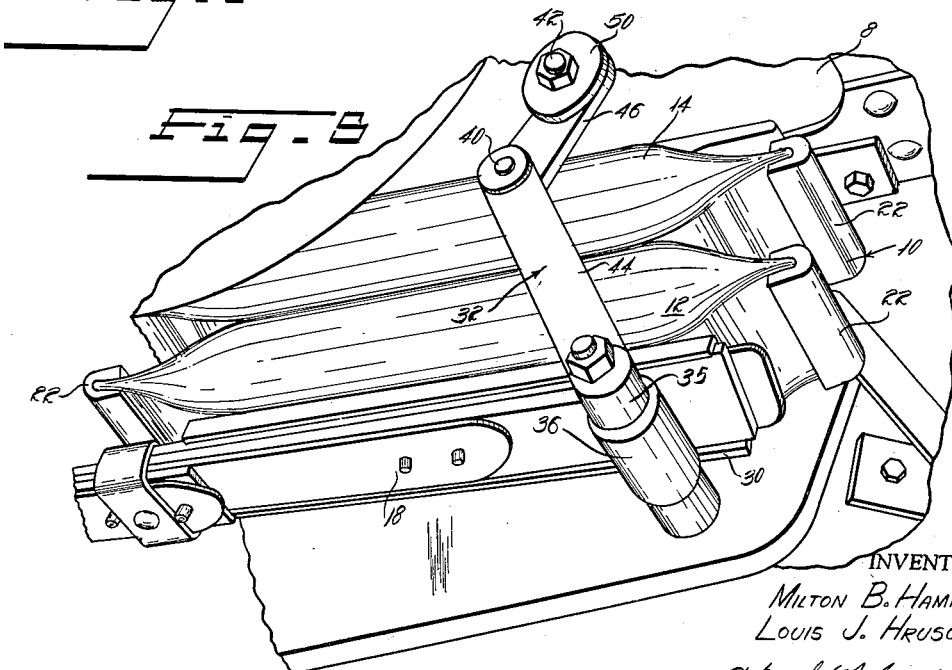
Figure 5 is a perspective view of expansible coupling interposed between the rear end of the leaf spring and the vehicle frame at the right rear of the vehicle.

Referring to Figures 2, 3 and 5, in its preferred form, the expansible coupling 9 is a longitudinally elongated rubber bellows 10, having lower and upper segments 12 and 14 interposed between the rear end of a conventional soft ride low rate leaf spring 18 and an adjacent portion 20 of the vehicle frame 8. In an embodiment of the invention we contemplate using a staged spring at 18 wherein one leaf or set of leaves is operative alone until it travels down a certain distance and then a second leaf or set of leaves comes into play thus increasing the rate. The term leaf spring in the claims includes both. The segments 12 and 14 of the bellows 10 are each formed of a relatively long tubular rubber body of generally elliptical cross-section, the opposite ends of which are sealed by clamps 22 and which are preferably bonded together along their adjacent contacting surfaces. At least one suitable aperture defining means 24 is provided to connect the chamber of bellows segment 12 in fluid communication with the chamber of bellows segment 14. The number and size of such means 24 should be sufficient to provide free fluid communication between the chambers of bellows segments 12 and 14. The top surface of bellows segment 14 is fixed to a mounting bracket 26 which in turn is fixed to a horizontally extending portion 28 of the frame 8. The bottom wall of the bellows segment 12 is fixed to a scuff plate 30 which is slidably received upon the end portion of the top leaf to the leaf spring 18 and permits free forward and rearward movement of the end portion of the leaf spring 18 in response to flexure of the leaf spring 18 without damage to the bellows 10.

The limits of expansion and contraction of the bellows 10 is established by a double pivot variable length shackle assembly 32 which is also effective to prevent lateral displacement of the rear end of the leaf spring 18 relative to the frame 8 while permitting free up or down movement of the rear portion of spring 18 with variations in the expansion of bellows 10 and free forward and backward movement of the ends of spring 18 in response to flexure thereof. Shackle assembly 32 comprises a pair of linkages located on opposite sides of the bellows 10 as is shown in Figure 3. The outer linkage comprises a long link 34 pivoted by a bushing 35 received within the eye 36 or other suitable attachment means of the rear end of the leaf spring 18, a short link 38 pivoted to the long link 34 by pivot pin 40 and to the frame 20 by pivot pin 42. The internal linkage is identical in construction and comprises long link 44 and short link 46. Washers 48 and 50 are provided on pivot 42 exteriorly of links 38 and 46 to retain links 38 and 46 and which, when the linkage 32 is completely collapsed abut against the upper surface of long links 34 and 44 respectively to form a stop to establish the minimum spacing between the bracket 26 and the scuff plate 30. This limitation on the minimum spacing between bracket 26 and scuff plate 30 prevents full collapse of the bellows 10 and damage thereto which would result from the normal flexure of the leaf spring 18 with the bellows 10 in its collapsed condition. The maximum spacing between the scuff plate 30 and the bracket 26 is established by the full expanded condition of the shackle assembly 32, when the axes of pivots 35, 40 and 42 are coplanar.

The degree of expansion of the bellows 10 between these limits is controlled by the introduction or the exhaust of compressed air via fluid conduit 52 under control of valve 54. Control valve 54, which is mounted on the frame or body within a compartment 53 sheltering it from dirt and moisture, is provided with an inlet port 55 connected to a conduit 56 which in turn is connected to an air tank 58 to which compressed air is supplied through a conduit 60 from an engine driven air compressor 59. Valve 54 is also provided with an atmospheric exhaust port 61. Valve 54 is of such construction that when the normal predetermined spatial relationship between the rear axle 7 and the frame 8 exists, the conduit 52 is in fluid communication with neither the compressed air supply conduit 56 nor the atmospheric exhaust port 61 of valve 54. When the spacing between the axle 7 and frame 8 is greater than the predetermined norm, valve 54 is actuated to connect conduit 52 to its atmospheric exhaust 61 to exhaust compressed air from bellows 10. When the spatial relationship between the frame 8 and the axle 7 is less than the predetermined norm, valve 54 is actuated to connect conduit 56 and conduit 52 in fluid communication to introduce additional compressed air into the bellows 10.

Referring to Figure 4, the vehicle frame 8 is suspended upon the outer ends of the rear drive axle 7 in the conventional manner as shown, the mid-point of the leaf spring 18 being suspended from the housing of axle 7 by conventional U-bolts 64, straddling the housing of axle 7, and a support plate 66 attached to U-bolts 64 by mounting nuts 68. A shock absorber 70 is pivotally interposed between thee plate 66 and the frame 8 in the conventional manner. The axle 7 is supported at its outer end by conventional pneumatic tires 72 mounted on a rim 74 and is provided with a conventional internally expansible brake mechanism 76.

Referring to Figure 3, valve 54 is provided with an actuating arm 78 which in its normal position, as shown, isolates conduit 52 from fluid communication with either conduit 56 or the atmospheric exhaust port 61 of valve 54 and which when raised from the neutral position as shown connects conduits 52 and 56 in fluid communication and which when lowered from the neutral position as shown connects conduit 52 in fluid communication with the atmospheric exhaust port 61 of valve 54.

Actuating arm 78 is connected to the plate 66 of the attachment assembly connecting the leaf spring to the axle housing by a linkage consisting of an apertured block 80 fixed to the end of the actuating arm 78, a coil spring 82 extending through the aperture of block 80 and supported at its opposite ends by a yoke 84, a block 86 pivotally supporting yoke 84, a thrust rod 88 depending from block 86 and a bracket 90 fixed to plate 66.

Thrust rod 88 is pivotally connected at its lower end upon bracket 90 by a pivot bolt 92 the axis of which extends generally parallel to the longitudinal axis of the vehicle. Rod 88 extends freely through an aperture 93 in the bottom wall of compartment 53. At its upper end rod 88 is threaded and extends through an aperture 94 in block 86 and is fixed relative to block 86 between upper and lower adjusting nuts 96 and 98. Cooperative adjustment of nuts 96 and 98 permits relative adjustment between the positions of blocks 86 and rod 88, and is utilized to position arm 78 in its neutral position for the desired spatial relation between the frame 8 and the adjacent end of axle 7.

Yoke 84 is formed by a pair of side plates 100 and 102 rigidly interconnected by pivot rod 104 which is journalled in an aperture 106 through block 86. Spring 82 is a coil spring the opposite ends of which are connected to the side plates 100 and 102 of the yoke 84 and the mid-portion of which extends through aperture 108 through the block 80. Spring 82 provides a resilient connection between yoke 84 and actuating arm 78 which, due to the inertia of the relative large mass of block 80, absorbs the small normal fluctuations in the normal predetermined spacing between the rear axle 7 and the frame 8 encountered during travel due to unevenness in the road surface without actuation of the valve 54. Only a general mean change in the distance between axle 7 and the frame 8 will producee movement of the valve actuating arm 78.

As is obvious, the fluid system herein disclosed may be of either the hydraulic or pneumatic types.

As was pointed out at the outset of this description, there are three basic inertia induced disadvantageous operating conditions of soft suspension equipped vehicles which the present invention is intended to alleviate. These conditions are: (1) lateral tipping of the vehicle body and frame relative to the axles, (2) rising of the rear of the vehicle upon rapid deceleration and (3) depression of the rear of the vehicle relative to the rear axle upon rapid acceleration. The operation of the present system will now be described for each of these three conditions.

Assume, for example, that the vehicle is rounding a curve to the right at a speed excessive for the bank of the road on which it is running. Under such conditions, there is a tendency, due to the inertia of the vehicle body and frame, for the left side of the vehicle to sink relative to the axles and for the right side of the vehicle to rise relative to the axles. As is apparent from the foregoing description, sinking of the left side of the vehicle frame relative to the left end of the rear axle will raise the arm 78 of the control valve 54 associated with the left end of the rear axle. This is effective to connect the bellows 10 associated with the suspension on the left end of the rear axle through conduits 52 and 56 to the air tank 58 so that additional compressed air will be introduced into the bellows 10 so long as the spacing between the vehicle frame 8 and the left end of the rear axle 7 is less than the predetermined norm. Simultaneously with the depression of the left side of the frame relative to the left end of the rear axle, the right side of the frame will rise relative to the right end of the rear axle. This will produce downward movement of the arm 78 of the control valve 54 associated with the right end of the rear axle thereby connecting the bellows 10 of the suspension for the right end of the rear axle through conduit 52 and valve 54 to the atmospheric exhaust port 61 of valve 54. This reduces the pressure within the bellows 10 at the right end of the rear axle, tending to collapse that bellows 10. Thus lateral tipping of the vehicle body to the left relative to the rear axle results in the introduction of compressed air into the bellows 10 associated with the left end of the rear axle and exhaust of air from the bellows 10 associated with the right end of the rear axle. The bellows 10 on the left end of the rear axle will expand to oppose the leftward tipping of the vehicle frame and the bellows 10 on the right end of the rear axle will collapse to lower the right side of the vehicle frame also in opposition to its leftward tipping movement.

Upon rightward tipping of the vehicle body, as in the event of rounding a left hand curve at a speed excessive for the bank of the curve, the operation of the control valve 54 at the left and right of the rear axle will be reversed to restore the vehicle frame to its normal position.

Actually no substantial tipping of the vehicle frame results. Once the vehicle begins to tip, the control mechanism for the bellows 10 becomes operative immediately except for the momentary inertia lag encountered in spring 82, block 80 and arm 78, to increase the pressure within the bellows 10 on the side toward which the lateral tipping occurs at a rate sufficient to equalize the centrifugal inertial force acting upon the vehicle body tending to produce the tip so that the body is stabilized.

The same action takes place to prevent tipping of the body due to loading of the vehicle body eccentric to the longitudinal axis of the vehicle.

In the event of rapid deceleration of the vehicle, the entire rear end tends to rise from the rear axle. This results in a simultaneous lowering of the arms 78 of both of the control valves 54 at the opposite ends of the rear axle. This connects both of the bellows 10 to the associated atmospheric exhaust ports of the associated valves 54 thereby tending to collapse the bellows 10 at both ends of the rear axle and lower the rear end of the vehicle frame.

In the event of rapid acceleration of the vehicle, which produces depression of the rear end of the vehicle frame relative to the rear axle, the arms 78 of both of the control valves 54 are raised from their neutral position. This connects both bellows 10 to the compressed air source 58 to expand the bellows 10 to counteract the depression of the rear end of the vehicle. This same compensating action takes place when the rear of the vehicle is depressed by loading of the rear seat or trunk.

Under all of the foregoing conditions, as the forces which produced actuation of the control valves 54 are relieved, the control valves 54 are actuated in the opposite direction to restore the pressure within the bellows 10 to their normal operating pressure.

While the foregoing description of operation is in reference to a pneumatic system, it is apparent that it is equally applicable to a hydraulic system.

The present invention controls tilting of the vehicle body and frame relative to the rear axle and makes it possible to turn safely at a higher rate of speed and permits sharper emergency swerving on the highway without danger of tipping over and with increased passenger comfort. This invention makes it possible for automobile manufacturers to provide in an automotive vehicle a soft spring ride for passenger comfort and at the same time have the stability of a hard spring ride sports car. Sinking of the vehicle rear end when the vehicle is started and accelerated is limited by the leveling valves 54 admitting more air into both bellows 10. Any tendency to the vehicle rear rise when brakes are applied is limited by valves 54 exhausting air from both bellows 10.

Test operation of our new improved vehicle leveling system installed in a current model passenger car shows that the leveling system maintains the elevation of both the right rear and left rear sides of the vehicle frame within a ⅜ inch range of normal when the vehicle is loaded between zero and one thousand pounds in various combinations of zero to six passengers and baggage. Tests with the same car not equipped with a leveling system have shown both the rear sides of the frame to pass through an elevation change range of three inches for the same loading combinations from zero to one thousand pounds.

From the foregoing it is apparent that there is hereby provided a new and improved leveling system for automotive vehicles comprising a rubber bellows between the rear portion of each rear spring and vehicle frame, leveling valves contained within a sheltering compartment and mounted on the vehicle body for the rubber bellows, leveling valves which are actuated through resilient interconnections within the sheltering compartment with actuating rods connected to the end portions of the rear axle, a double pivot shackle assembly for the rear end of each leaf spring and pivot shackle assembly limit means which prevents bottoming of the rubber bellows between the spring and frame.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a vehicle, a frame, an axle extending transversely of said frame, a leaf spring mounted on each end of said axle and connected at each end to said frame, a pair of expansible fluid chambers, one interposed between said frame and one end of each of said leaf springs, means structurally independent of said fluid chambers and connected between said frame and each of said leaf spring one ends confining relative movement therebetween to movement resulting from variations in the degree of expansion of said chambers, said last named means comprising a pivoted linkage, a source of fluid under pressure, means connecting said source and each of said chambers, and means for so independently controlling the introduction into and exhaust from said chambers of fluid from said source as to maintain a substantially uniform spacing between said axle ends and said frame during all normal conditions of operation of said vehicle.

2. In a vehicle, a frame, an axle extending transversely of said frame, a leaf spring mounted on each end of said axle and connected at each end to said frame, a pair of expansible fluid chambers, one interposed between said frame and one end of each of said leaf springs, a source of fluid under pressure, means connecting said source and each of said chambers, and means for so independently controlling the introduction into and exhaust from said chambers of fluid from said source as to maintain a substantially uniformed spacing between said axle ends and said frame during all normal conditions of said vehicle, said expansible fluid chambers being bellows and said one end of each said leaf spring being connected to said frame by a pair of pivotally connected links pivoted to said frame and to said leaf spring respectively.

3. The vehicle defined in claim 2 wherein said bellows is formed of elastomeric material and wherein said linkage includes a stop means for preventing complete collapse of said bellows.

4. The vehicle defined in claim 1 wherein said controlling means comprises a control valve associated with each said fluid chamber, a conduit connecting each said control valve to said fluid source, conduits connecting each said control valve to the associated expansible chamber, each said valve having an exhaust outlet and an actuator operative in a first position to connect the associated chamber and said fluid source in fluid communication, in a second position to connect the associated chamber and its exhaust outlet in fluid communication, and in a third position to isolate the associated chamber from both said fluid source and said exhaust port, and means associated with each such valve and responsive to inertia induced changes in the relative position between said frame and axle for actuating the associated valve to vary the pressure within the associated fluid chamber to substantially offset said inertia induced changes.

5. In a vehicle, a frame, an axle supported at its outer ends by wheels and extending transversely of said frame, a spring suspension at each end of said axle resiliently supporting said frame upon said axle, a body attached to said frame, and means for automatically offsetting relative movement between said frame and said axle induced by inertia of said frame and body, said last named means comprising an expansible fluid chamber operatively interposeed between said spring suspension and said frame at each end of said axle, means connected in parallel to said fluid chamber between said frame and suspension to confine relative movement therebetween to that resulting from said variations in the expansion of said expansible fluid chamber, said last named means comprising a pivoted linkage, independent means associated with each said expansible fluid chamber for controlling the fluid pressure therein, and independent means associated with each end of said axle for detecting frame and body inertia induced changes in the relative spacing between said frame and the associated end of said axle and operative to actuate said pressure controlling means to adjust the fluid pressure within the expansion fluid chamber associcated with the associated end of said axle to adjust the pressure within said fluid pressure responsive means to compensate for such change in the relative spacing.

6. In combination, a vehicle frame, an axle extending transversely of said frame, a leaf spring attached midway of its length to each end of said axle and suspending said frame, means at each end of each of said leaf springs for connecting said leaf spring to said frame, one of said means for each said axle comprising an expansible and compressible fluid chamber operative as a vehicle levelizer and supplementary suspension, and means for so independently introducing an exhausting fluid at each of said chambers as to maintain a substantially uniform spacing between said axle and said frame during vehicle operation and drive said one connecting means for each leaf spring further comprising a pivoted linkage confining relative movement between said frame and the associated end of said leaf spring to movement resulting from flexure of said leaf spring and variations in the expansion of said expansible and compressible chamber.

7. The combination defined in claim 6 wherein each said linkage comprises a pair of pivotally interconnected links pivotally connected to the associated end of said leaf spring and to said frame.

8. The combination defined in claim 6 wherein said linkage includes stop means for preventing complete collapse of said expansible and compressible chamber.

9. In combination with a vehicle frame, a transverse axle and a pair of leaf springs suspending said frame upon opposite ends of said axle, a vehicle leveling system comprising a pair of expansible fluid chambers, one adapted to be interposed between one end of one of said axle mounted leaf springs and the associated vehicle frame at each end of said axle, means connected in parallel with said fluid chambers between said frame and said leaf spring one ends for confining relative movement therebetween to that resulting from variation in the expansion of said expansible fluid chambers, said last named means comprising a pivoted linkage, a source of fluid pressure, a pair of control valves, one of said control valves being interposed between each of said expansible fluid chambers and said fluid pressure source and adapted to control the introduction of fluid into the associated chamber and the exhaust of fluid therefrom during all normal operating conditions of the vehicle, a pair of links one connected at its lower end to each of the outer ends of said axle, and means mounting each of said links for movement in a substantially vertical direction relative to said frame in response to movement of the associated outer end relative to the frame, and means connecting the upper end of each said link to the one of said control valves associated with the expansible chamber for the end of said axle with which said link is associated to actuate said valve, each said valve being of such construction that, upon upward movement of the associated link relative to the frame from a predetermined normal position, fluid is introduced into the associated fluid chamber and, upon downward relative movement of the associated link relative to the frame from such predetermined normal position, fluid is exhausted from the associated fluid chamber.

10. The combination defined in claim 9 wherein the upper end of each said link is connected to actuate the associated control valve by means adapted to transmit only relative movement between the axle outer end and vehicle frame induced by inertia of the vehicle frame.

References Cited in the file of this patent

UNITED STATES PATENTS

| | | |
|---|---|---|
| 1,516,004 | Eckrode | Nov. 18, 1925 |
| 1,641,640 | Meyers | Sept. 6, 1927 |
| 1,662,327 | Patten | Mar. 13, 1928 |
| 2,110,809 | Murphy | Mar. 8, 1938 |
| 2,361,575 | Thompson | Oct. 31, 1944 |
| 2,490,311 | Rostu | Dec. 6, 1949 |
| 2,496,893 | Smith | Feb. 7, 1950 |
| 2,687,311 | Nallinger | Aug. 24, 1954 |
| 2,704,665 | Zoltock | Mar. 22, 1955 |
| 2,771,303 | Frazier | Nov. 20, 1956 |